W. O. SHADBOLT.
TRUCK.
APPLICATION FILED APR. 4, 1916.

1,245,276.

Patented Nov. 6, 1917.
3 SHEETS—SHEET 1.

Inventor:
William Oscar Shadbolt
By his Attorney
Edmund Conger Brown

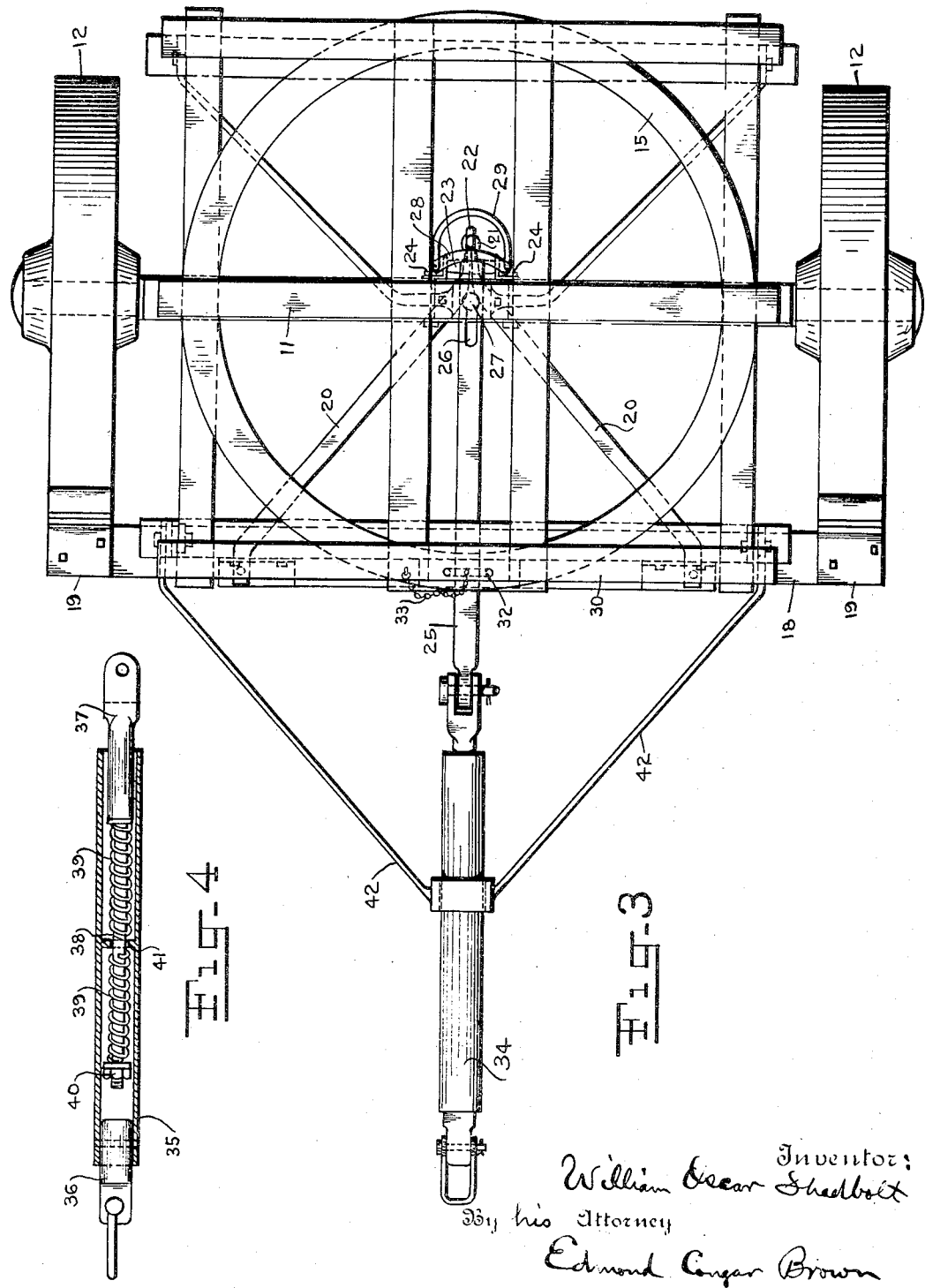

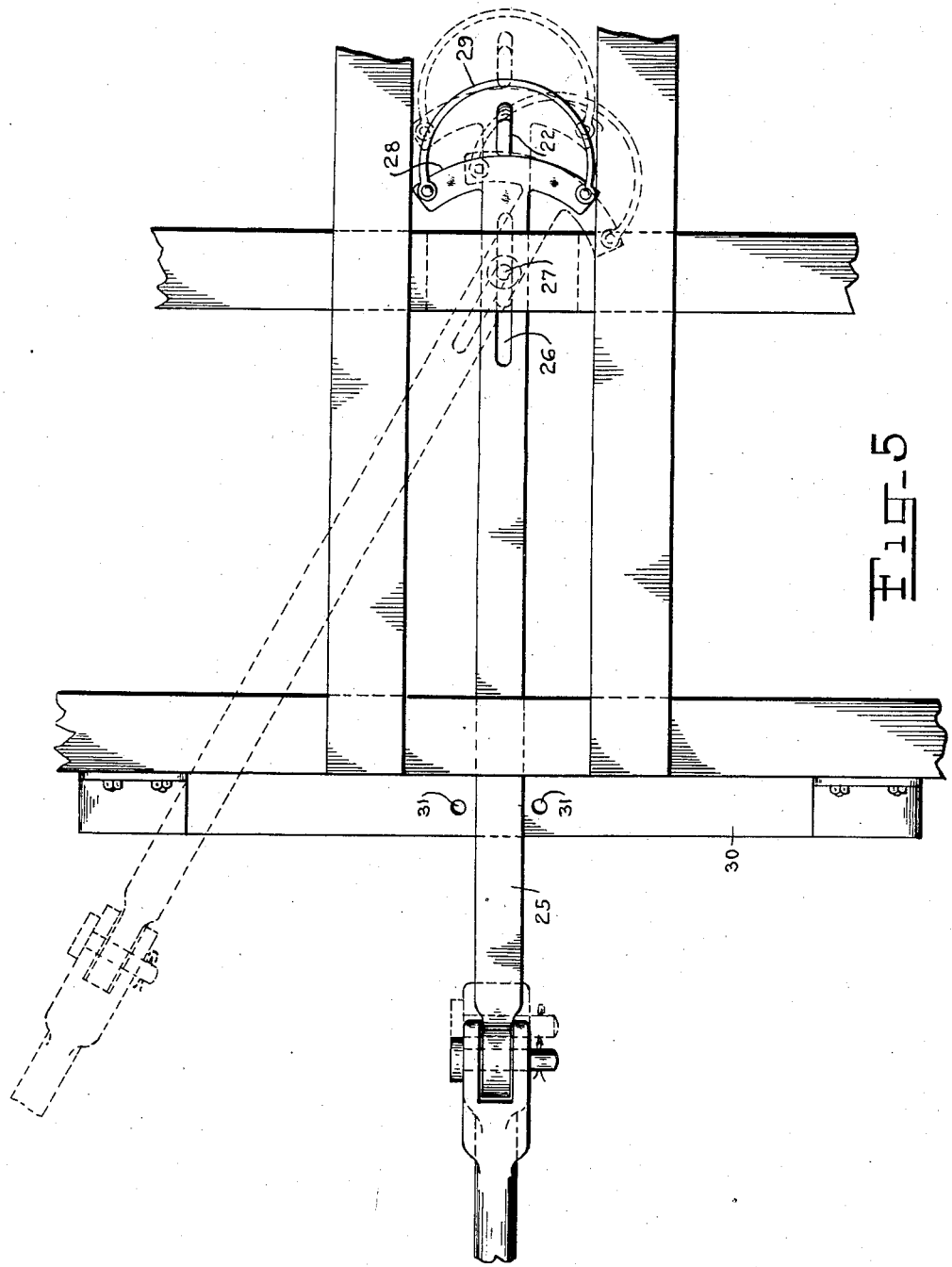

UNITED STATES PATENT OFFICE.

WILLIAM OSCAR SHADBOLT, OF BROOKLYN, NEW YORK.

TRUCK.

1,245,276. Specification of Letters Patent. Patented Nov. 6, 1917.

Application filed April 4, 1916. Serial No. 88,859.

*To all whom it may concern:*

Be it known that I, WILLIAM OSCAR SHADBOLT, a citizen of the United States, and a resident of the borough of Brooklyn, in the city and State of New York, have invented certain new and useful Improvements in Trucks, of which the following is a specification.

My invention relates to trucks and other vehicles, and particularly to means for coupling and means for braking the same, and has for some of its principal objects to provide a brake adapted to be secured to a trailer truck and provided with automatic mechanism whereby the brake is applied when the tractor is slowed down or whenever the truck tends to run faster than the tractor and means adapted to couple one or more trailers to a tractor or to each other. Other objects of the invention will be apparent from the following description.

The invention consists in the novel construction, arrangement and combination of various devices, elements and parts, as shown in the accompanying drawings, and hereinafter more particularly described.

Figure 1:
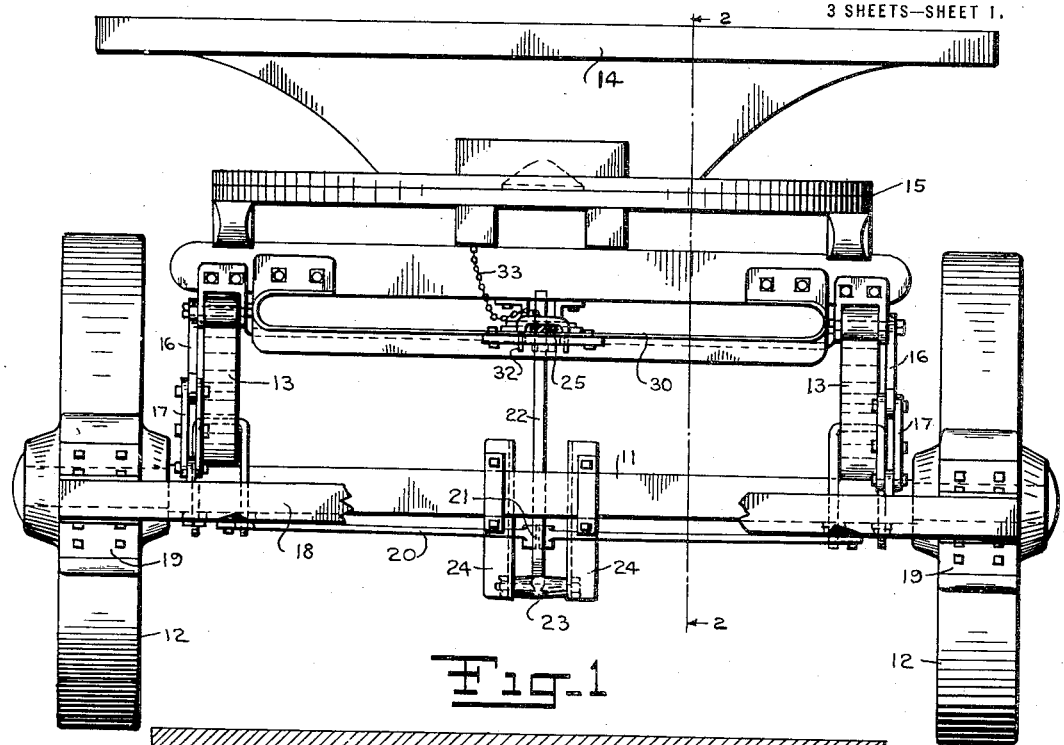
Figure 2:
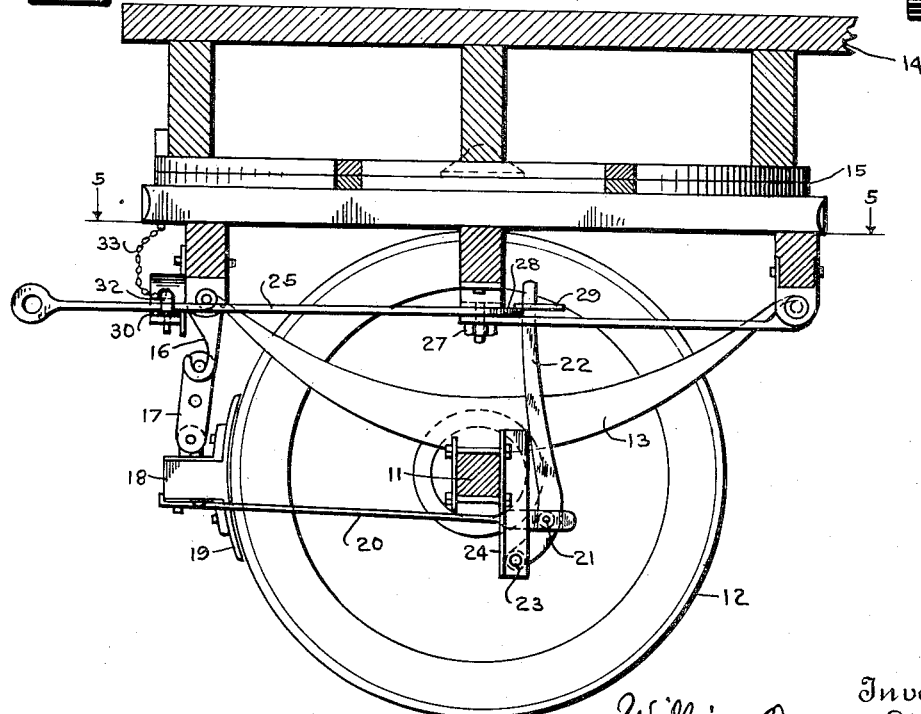

In the said drawings, Figure 1 is an end elevation of the running gear of a truck provided with my invention; Fig. 2 is a section taken on the line 2—2 of Fig. 1 and looking in the direction of the arrows; Fig. 3 is a plan view of the said running gear; Fig. 4 is a detail view to be hereinafter more particularly described; and Fig. 5 is a section, on an enlarged scale, taken on the line 5—5 of Fig. 2, looking in the direction of the arrows.

My invention is particularly adapted for use with trailer trucks of which both the front and rear axles are adapted to swivel, and which are provided with means whereby when one axle is swung in one direction, the other axle shall swing in the opposite direction. In the drawings only one set of running gear is shown, but it will be understood that the brake mechanism described may be applied to both sets of running gear.

In carrying my invention into effect in the embodiment thereof which I have selected for illustration in the accompanying drawings and description in this specification, I provide the usual running gear comprising an axle 11, wheels 12, and springs 13 pivotally secured to the body of the truck, which I have designated 14, by means of a suitable fifth wheel 15.

Located on the running gear are hooks 16, to which are suspended by means of links 17 a cross-bar 18, bearing at its outer extremities brake shoes 19 adapted to bear against the wheels 12. Extending from the cross-bar 18 toward the center of the truck are rods 20, having their inner ends pivotally secured at 21 to a vertical lever 22 fulcrumed at 23 in members 24 extending downward from the axle 11.

I provide a horizontal connecting rod 25, (the details of which are shown best in Fig. 5) having a slot 26, through which passes a bolt 27 by means of which the rod 25 is pivotally and slidably connected to the running gear at a point directly under the pivotal point of the fifth wheel 15. The inner end of the rod 25 is provided with a curved bearing surface 28 adapted to bear against the upper end of the lever 22 and with a guard 29 adapted to prevent the end of said lever from passing beyond the end of the bearing surface when the rod 25 is swiveled, as shown by the dotted lines in Fig. 5. A portion of the rod 25 near its outer end rests upon a runway 30, in which it may swing to one side or the other. At the center of this runway I provide perforations 31, adapted to receive a forked pin 32, by means of which the rod 25 may be held against swinging laterally, but still permitted to slide longitudinally. The pin 32 may be secured to the running gear by a chain 33, in order that it may not be lost. This connecting rod may also be employed as a coupling means merely, eliminating its braking function, as hereinafter referred to.

Removably secured to the outer end of the bar 25 is a resilient connecting link 34, the construction of which is shown in detail in Fig. 4. It consists of a tube 35, provided at one end with connecting means 36 rigidly secured thereto, and being open at the other end. A rod 37 is provided, having means whereby it may be connected with the outer end of the rod 25, said rod 37 being provided with a portion 38 of small diameter extending into the tube 35. Helical springs 39 surround this portion 38, the outer one being retained in place by means of a nut 40. The tube 35 is provided with an interior constriction 41 between the springs 39. The link 34 is secured against swinging laterally independently of the running gear by means of removable braces 42.

Although brakes constructed according to my invention may be advantageously employed on many kinds of vehicles, they are specially adapted for use on trailer trucks having both axles swingingly mounted, and which are adapted to be connected one behind another, several at a time being hauled by a tractor. The operation of my invention will therefore be described with reference to such trailer trucks.

It will be understood that these trucks preferably have both axles fitted with the brake, and that as the two ends are exactly alike, either end may be used as the front, to be connected with a tractor or with another trailer truck which is in turn connected with a tractor; or as the rear, to be connected with the front end of another trailer.

The running gear on the end of the truck which is to be used as the front should have the pin 32 in place, and if it is desired to use the resilient connection 34, it and the braces 42 should also be in place, the portion 36 being secured to the rear of the tractor, or to the rear of a truck which is in turn connected with the tractor.

In this position the link 34 and rod 35 are held against swinging sidewise independently of the running gear, but are free to slide longitudinally. If the tractor or truck ahead turns to one side, the front end of the link 34 is also turned to one side, and the axle is swung, causing the trailer to follow the vehicle ahead. In case of a slowing down of the vehicle ahead, the rod 25 is forced backward, bearing against the top of the lever 22 and forcing the same back, this lever in turn drawing back the rod 20 and applying the brakes 19. The resilient link 34 takes up any sudden shocks in starting or stopping.

On the end of the truck which is to be used as the rear, it is necessary that the rod 25 should swing independently of the running gear, otherwise the front axle of the truck behind would be turned in the wrong direction when rounding a curve. The pin 32 is therefore removed, and as a resilient connection may be provided on the front connecting bar 25 of the truck, the connection on the rear of the truck, and the braces 42, are also removed. The connecting bar 25 is thus free to swing transversely on the pivot 27, and by means of the curved bearing surface 28, will always rest against the top of the lever 22, even when rounding a curve, but will have no tendency to apply the brakes unless there is a stoppage of the forward truck or an acceleration of the rear truck. In such a case the brakes of the rear wheels are applied in a manner similar to that of the brakes on the front wheels.

The advantages of my invention will be obvious from what has been above said concerning its construction and mode of operation. I do not limit myself to the exact form described as it is obvious that various modifications might be made, without departing from the spirit and scope of my invention. It is also obvious that a rod such as 25, pivoted under the fifth wheel, and provided with means adapted to permit or prevent it from swinging with relation to the running gear, may be used on trucks or trailers irrespective of any brake mechanism, in which case the parts 28 and 29 may be omitted, and a perforation substituted for the slot 26. It will also be obvious that the resilient connection 34 may be used independently of brake mechanism or of any special connecting mechanism.

Having thus described my invention what I claim as new and desire to secure by Letters Patent is as follows:

1. In a vehicle, the combination with running gear and a body; of a brake shoe on said running gear, and means adapted to operate said brake shoe and to be operated by another vehicle or the like when said two vehicles approach each other, at whatever angle said vehicles may be placed with reference to each other; said means comprising a rod adapted to force said brake shoe against a wheel on said first named vehicle, a lever adapted to operate said rod, and a rod slidably mounted on said running gear and adapted to bear against the upper portion of said lever and to be operatively connected with said second named vehicle.

2. In a vehicle, the combination with running gear and a body; of a brake shoe on said running gear, and means adapted to operate said brake shoe and to be operated by another vehicle or the like when said vehicles approach each other at whatever angle said vehicles may be placed with reference to each other; said means comprising a rod adapted to force said brake shoe in contact with a wheel, a lever adapted to operate said rod, and a second rod slidably and pivotally mounted on said running gear adapted to bear against said lever and to be operated by said second named vehicle.

3. In a vehicle, the combination with running gear and a body; of a brake shoe on said running gear, and means adapted to operate said brake shoe and to be operated by another vehicle or the like when said vehicles approach each other at whatever angle said vehicles may be placed with reference to each other; said means comprising a rod adapted to force said brake shoe in contact with a wheel, a lever adapted to operate said rod, and a second rod slidably and pivotally mounted on said running gear adapted to be operated by said second named vehicle, and provided with a curved bearing surface adapted to operate said lever.

4. In a vehicle, the combination with running gear and a body; of a brake shoe on said running gear, a rod adapted to force said brake shoe in contact with a wheel, a lever adapted to operate said rod, a second rod slidably and pivotally mounted on said running gear adapted to operate said lever and to connect said vehicle with another vehicle or the like, and means adapted to prevent said rod from swinging while permitting it to slide.

5. In a vehicle, the combination with running gear and a body; of a brake shoe on said running gear, a rod adapted to force said brake shoe in contact with a wheel, a lever adapted to operate said rod, a second rod slidably and pivotally mounted on said running gear adapted to operate said lever and to connect said vehicle with another vehicle or the like, and means adapted to prevent said second named rod from swinging while permitting it to slide, said means comprising a forked pin adapted to straddle said rod and engage with said running gear.

6. In a vehicle, the combination with running gear and a body; of a brake shoe on said running gear, a rod adapted to force said brake shoe in contact with a wheel, a lever adapted to operate said rod, a second rod adapted to operate said lever and to connect said vehicle with another vehicle or the like, said rod being provided with a slot, and a bolt on said running gear adapted to pass through said slot and to slidably and pivotally connect said last named rod to said running gear.

7. In a vehicle, the combination with running gear and a body; of a brake shoe on said running gear, a rod adapted to force said brake shoe in contact with a wheel, a lever adapted to operate said rod, and a second rod slidably mounted on said running gear adapted to bear against the upper portion of said lever and to connect said vehicle with another vehicle or the like, said last named rod being provided with resilient connecting means.

8. In a vehicle, the combination with running gear and a body; of a brake shoe on said running gear, a rod adapted to force said brake shoe in contact with a wheel, a lever adapted to operate said rod, and a second rod slidably mounted on said running gear adapted to operate said lever and to connect said vehicle with another vehicle or the like, said last named rod being provided with removable resilient connecting means.

9. In a vehicle, the combination with running gear and a body; of a brake shoe on said running gear, a rod adapted to force said brake shoe in contact with a wheel, a lever adapted to operate said rod, a second rod slidably mounted on said running gear adapted to operate said lever, and a resilient connection adapted to connect said second named rod with another vehicle or the like; said connection comprising a tube provided with an internal constriction, and adapted to be connected with said second named vehicle, a third rod adapted to be connected with said second named rod, and a spring adapted to operate between said last named rod and said constriction.

10. In a vehicle, the combination with running gear and a body; of a slotted rod swingingly and slidingly mounted on said running gear and adapted to connect said vehicle with another vehicle or the like, and means adapted to prevent said rod from swinging with relation to said running gear, or to permit said rod so to swing.

11. In a vehicle, the combination with running gear and a body; of a slotted rod slidingly pivoted to said running gear underneath the point where said running gear is pivoted to said body, said rod being adapted to connect said vehicle with another vehicle or the like, and means adapted to prevent said rod from swinging with relation to said running gear, or to permit said rod so to swing.

12. In a vehicle, the combination with running gear and a body, of a slotted rod swingingly and slidingly mounted on said running gear and adapted to connect said vehicle with another vehicle or the like, and means adapted to prevent said rod from swinging with relation to said running gear or to permit said rod so to swing; said means comprising a pair of perforations located in said running gear, and a forked pin adapted to straddle said rod and rest in said perforations.

13. In a vehicle, the combination with running gear and a body; of a slotted rod slidingly pivoted to said running gear underneath the point where said running gear is pivoted to said body, said rod being adapted to connect said vehicle with another vehicle or the like, and means adapted to prevent said rod from swinging with relation to said running gear, or to permit said rod so to swing; said means comprising a pair of perforations located in said running gear, and a forked pin adapted to straddle said rod and rest in said perforations.

14. In a vehicle, the combination with running gear and a body, of a slotted rod slidingly and swingingly mounted on said running gear, means adapted to prevent said rod from swinging with relation to said running gear, or to permit said rod to swing, and resilient means adapted to connect said rod with another vehicle or the like.

15. In a vehicle, the combination with running gear and a body; of a slotted rod slidingly and swingingly mounted on said running gear, means adapted to prevent said rod from swinging with relation to said running gear, or to permit said rod to swing, and resilient means adapted to connect said rod with another vehicle or the like; said means comprising a tube, a rod adapted to slide in said tube, and a spring acting between said rod and said tube.

16. In a vehicle, the combination with running gear and a body, of a slotted rod slidingly and swingingly mounted on said running gear, means adapted to prevent said rod from swinging with relation to said running gear, or to permit said rod to swing, and resilient means adapted to connect said rod with another vehicle or the like; said means comprising a tube provided with an internal annular shoulder, a rod provided with a shoulder and with a stop adjacent one end, a spring acting between said shoulders, and a spring acting between the shoulder of said tube and the stop on said rod.

In witness whereof I have hereunto signed my name this 23d day of March 1916.

WILLIAM OSCAR SHADBOLT.